Aug. 27, 1946.  J. N. GRAEF  2,406,366
CAMERA
Filed July 31, 1942  2 Sheets-Sheet 1

Inventor
John N. Graef

By Strauch & Hoffman
Attorneys

Aug. 27, 1946.  J. N. GRAEF  2,406,366
CAMERA
Filed July 31, 1942  2 Sheets-Sheet 2

Inventor
John N. Graef

By Strauch & Hoffman
Attorney

Patented Aug. 27, 1946

2,406,366

UNITED STATES PATENT OFFICE 2,406,366

CAMERA

John N. Graef, Ann Arbor, Mich.

Application July 31, 1942, Serial No. 453,073

10 Claims. (Cl. 95—31)

My invention relates to roll film cameras and is particularly concerned with arrangements for preventing accidental double exposure of the film in such cameras, and related construction.

It is a primary object of the invention to provide novel shutter and film handling mechanism and controls for a roll film camera wherein a fresh section of film must be advanced to the exposure aperture following each complete actuation of the shutter and before the shutter can again be actuated to make another exposure, and wherein advance of the film is positively arrested when said fresh section of film is located at the exposure aperture and cannot be resumed until after actuation of the shutter.

A further object of the invention is to provide a roll film camera having a single control member connected by novel mechanism to actuate the shutter to expose the film and at substantially the same time to release film arresting means to permit a fresh section of film to be advanced to the exposure aperture after each exposure.

A further object of the invention is to provide novel roll film camera mechanism whereby the shutter controls are locked in inoperative position after each exposure and automatically unlocked when a fresh section of film has been advanced to the exposure aperture.

A further object of the invention is to provide novel lock and release mechanism between the shutter lever and a film driven member in a roll film camera. Preferably this film driven member is a sprocket, which in turn drives the exposure counter.

A further object of the invention is to provide a novel adjustable shutter actuating linkage in a roll film camera.

A further object of the invention is to provide novel focusing and light control mechanism in a camera.

A further object of the invention is to provide a novel take up spindle embodying a roller wedge for gripping and holding the leading end of the film.

Further objects of the invention will presently appear as the description proceeds in connection with the appended claims and the annexed drawings in which:

Figure 1:
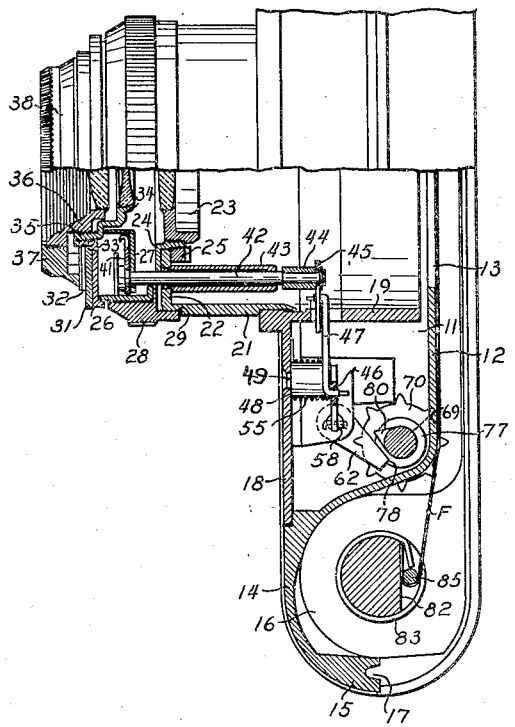
Figure 1 is a bottom elevation, partly in section, of the major part of a camera body embodying the novel film feed and shutter control mechanism and other details of the invention.
Figure 2:
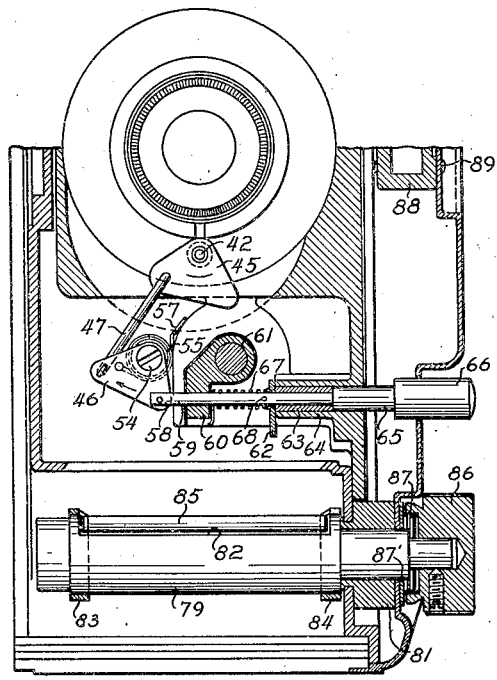
Figure 2 is a rear elevation, partly in section, of the camera body of Figure 1, illustrating further details of the mechanism.

Referring to Figures 1 and 2, my camera comprises a body of diecast aluminum or other suitable material formed with a central, forwardly-facing, substantially cup-shaped depression 11 at the bottom of which is an intermediate wall 12 formed with an exposure aperture 13. Wall 12 at both ends extends forwardly and laterally outwardly, as shown in Figure 1, to integrally join one end section 14 of the camera front wall. One wall section 14 extends arcuately rearwardly to form part of one end wall 15 of the camera and to define the lower half of a take up spool chamber 16. The rearwardly facing edge of wall 15 is formed with a groove 17 adapted to interfit with the corresponding end wall part on the camera back cover (not shown). The other end wall and supply spool chamber construction (not shown) is substantially the same, as the camera is symmetrical.

The back cover for the camera is a unitary affair substantially the same as that shown in the co-pending application of Clinton H. Harris, Serial No. 413,518, filed October 3, 1941, now Patent No. 2,378,406, issued June 19, 1945, comprising the entire camera back wall, on the front face of which is resiliently mounted a pressure plate adapted to engage and hold flat a film passing over suitable guides on wall 12, the entire bottom wall of the camera, and partial end walls shaped to interfit with end walls 15 of the camera body. Since this preferred type of camera back, which is not shown in the drawings, forms no part of the present invention, further description thereof is unnecessary.

The front wall of the camera comprises a central section 18 which is seated on the body substantially flush with end sections 14 and held rigid with the camera body by screws or similar fastening means. It is thereby removable for adjustment, repair and replacement of the parts within depression 11 for which it forms a complete dust- and light-tight cover. Wall section 18 is centrally formed with an integral cylindrical tubular shell 19 which extends into depression 11 almost to wall 12. Shell 19 serves to guard against light entering the lens tube from exposing the film being wound beyond the lens aperture.

Figure 6:
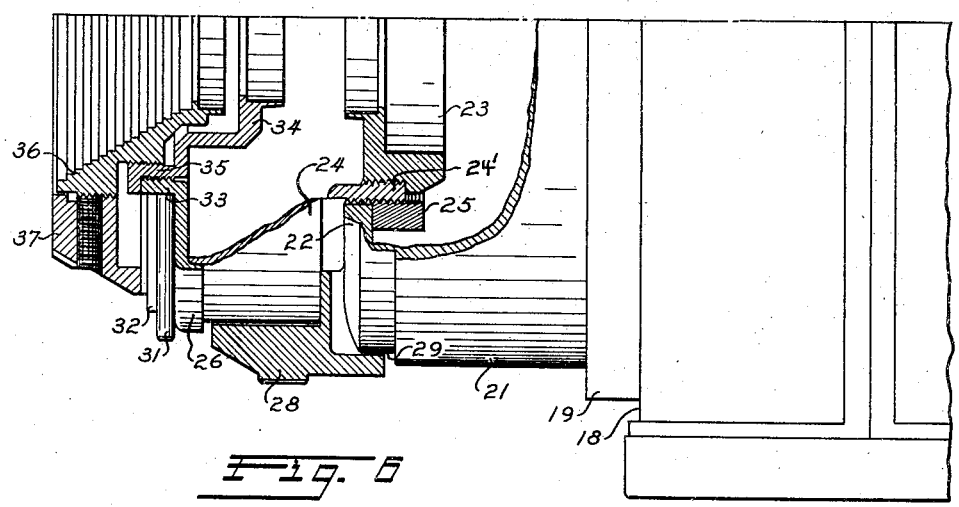
Figure 6 is a fragmentary side elevation, partly in section, illustrating the shutter and lens adjustments on the lens mount tube.

Shell 19 projects a short distance forwardly of the front surface of wall section 18 and has non-rotatably secured thereto a shutter mount tube 21 which extends a substantial distance forwardly of the camera front wall. Tube 21 is formed at its forward end with an inturned flange 22, upon which a shutter assembly support 24 is clamped by means of a threaded collar 24' on said support and lock nut 25. Rear lens cell 23 is threadedly mounted in collar 24' as shown in Figure 6.

Shutter assembly support 24 is rigidly and non-rotatably secured to tube 21 by lock nut 25 and a locating pin (not shown) attached to flange 22. Support 24 houses suitable iris diaphragm and shutter mechanism just forwardly of rear lens cell 23, the tripping mechanism for the shutter being located in enclosure 27 (Figure 1). A diaphragm adjustment ring 28, suitably connected to vary the diaphragm opening, is rotatably mounted on support 24 and connected to actuate the diaphragm in the usual manner. At its rear edge, ring 28 extends over external shoulder 29 on the front end of tube 21 to thereby form a light tight joint, and is marked with suitable diaphragm opening indicia cooperating with a suitable index on the tube 21. Since the structural details of the shutter and the iris diaphragm are not part of the present invention, further description thereof is not needed.

At its front end, support 24 mounts a front support plate 26 which rotatably carries a shutter adjustment ring 31 which bears suitable indicia cooperating with an index on the periphery of an indicator disc 32 rigid with support plate 26. The front end of support 24 is also provided, preferably on plate 26, with an internally threaded flange 33 on which is threadedly secured the center lens cell 34. The front flange 35 of lens cell 34 is internally threaded for adjustably mounting a front lens cell 36. A calibrated ring 37, rigidly secured to front lens cell 36, is preferably knurled so that it can be gripped and turned for focusing, and is provided with focus markings 38 cooperating with a suitable index on the front face of stationary indicator disc 32.

By the above construction, the rear and center lenses are axially fixed with the shutter and diaphragm therebetween, and the front lens is axially adjustable by rotation of ring 37 for properly focusing the image on the film at exposure aperture 13.

Enclosure 27 of the shutter assembly support houses shutter trip levers 39 and 41 of conventional construction. In my preferred embodiment of the invention, I employ conventional connections (not shown) between ring 31 and the trip levers whereby the trip levers may be selectively positioned for instantaneous or time exposures. Lever 41 is non-rotatably mounted on the front end of an elongated shutter operating shaft 42 which is rotatably supported in a long bearing sleeve 43 brazed or otherwise non-rotatably secured to flange 22 of the shutter mount tube.

At its rear end, which is located substantially within the camera body, shaft 42 is formed with a reduced end portion on which is non-rotatably secured a sleeve 44 soldered or otherwise non-rotatably secured to a corner of a triangular lever plate 45. Lever 45, shaft 42 and lever 41 rotate as a unit to trip the shutter.

Figure 4:
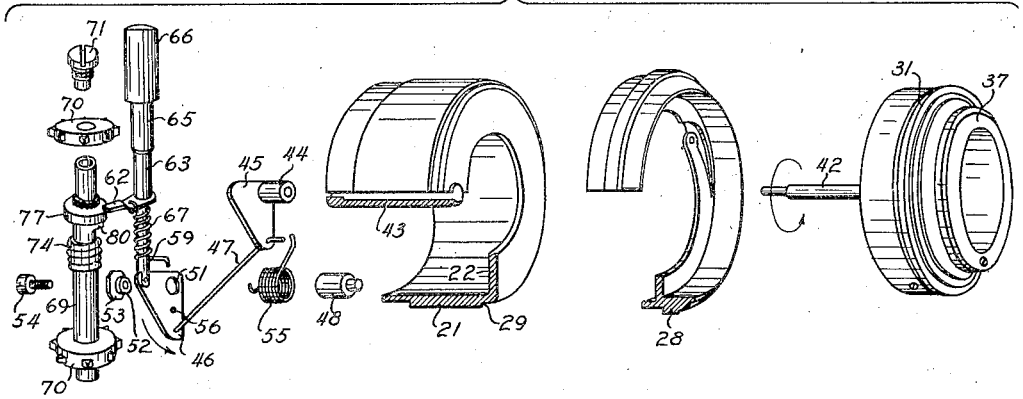
Figure 4 is an exploded view of the shutter and film feed control mechanism of the camera of Figure 1, illustrating the parts thereof in detail.
Figure 3:
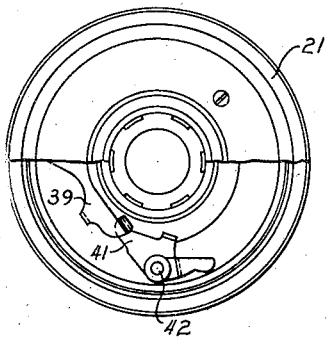
Figure 3 is a fragmentary front elevation of the shutter employed in the camera of Figure 1.

As shown in Figures 2 and 4, lever 45 is pivotally connected to a similar triangular bell crank lever 46 by a link 47 which is preferably a round wire having its ends bent at right angles in opposite directions and inserted into suitable corner apertures in levers 45 and 46.

Lever 46 is rotatably mounted on the inner side of front wall section 18. A suitable post 48 is formed with a reduced plug 49 which is inserted into a suitable hole in wall 18 and therein brazed or otherwise non-rotatably secured so that post 48 forms a rigid support extending rearwardly into depression 11 from the front camera wall 18. In one corner, lever 46 (Figure 4) is provided with a circular aperture 51 adapted to fit rotatably with a circular boss 52 formed integrally and concentric with the rear face of a plate 53 whose perimeter is shaped to be gripped by a suitable tool such as a wrench. A machine screw 54 extends through suitable aligned eccentric apertures in plate 53 and boss 52 into a tapped hole in the rear end of post 48, and when screw 54 is tightened with boss 52 seated within aperture 51, lever 46 is rotatably journalled on boss 52. Care is taken not to bind lever 46 between post 48 and plate 53. Since boss 52 is eccentric with the axis of aperture 51, it will be seen that the effective leverage of lever 46 can be adjusted simply by rotating plate 53 to shift the center of rotation of lever 46. A coil spring 55, surrounding post 48, has one end secured within a suitable aperture 56 in lever 46 and the other end anchored, as at 57, on a suitable part rigid with wall 18. Spring 55 is a torsion spring functioning to urge rotation of lever 46 in the opposite direction of the arrow shown in Figure 2, and is thus the main spring of the shutter actuating mechanism for returning said mechanism to operative condition.

Figure 5:
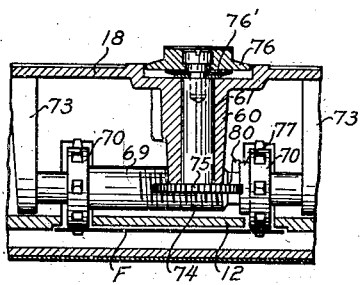
Figure 5 is a fragmentary view illustrating the manner in which the exposure counter is driven from the sprocket.

A third corner of lever 46 is pinned or otherwise pivotally received within the bifurcated lower end 58 of a plunger 59 which extends at right angles to the axis of the lens assembly. Above lever 46, plunger 59 extends slidably through a rearwardly projecting boss 60 which is rigid with the camera front wall and also serves as a journal for exposure counter shaft 61 (Figure 5). The bifurcated connection between plunger 59 and lever 46 prevents rotation of the plunger about its axis.

A pawl 62 is rotatably mounted on plunger 59 and has non-rotatably secured thereto an upwardly extending sleeve bushing 63 which surrounds plunger 59 and extends slidably into a downwardly projecting guide boss 64 integral with the camera body. Beyond bushing 63, plunger 59 is formed with an enlarged section 65 abutting bushing 63 and slidably supported in the camera body. The plunger then extends from the camera body through the space between the body and the top cover, where it is further enlarged to provide an external manually accessible button 66 on the top of the camera.

A combined torsion and compression spring in the form of a coil spring 67, extending between boss 60 and the bottom face of pawl 62, surrounds plunger 59 and functions both to urge plunger 59 upwardly towards the top of the camera and also to rotate pawl 62 counterclockwise as shown in Figure 1. This is accomplished by anchoring one end of spring 67 on boss 60 and securing the other end to pawl 62 (Figure 4). A locking pin 68 cooperates with boss 64 to prevent relative axial movement between plunger 59 and pawl 62.

A sprocket 69 having the usual toothed wheels 70 for engaging the film is rotatably supported by pin bearings 71 and 72 on spaced supports 73 rigid with front wall section 18. As shown in Figure 1, sprocket wheels 70 extend through suitable slots in wall 12 to be engaged by the film. Intermediate its ends, sprocket 69 is formed with a worm thread 74 meshed with worm wheel 75 on the rear end of exposure counter shaft 61. The front end of shaft 61 carries an indicator dial 76 connected thereto by a frictional clutch 76'. This manner of driving the exposure counter shaft from the sprocket is disclosed in the copending application of Clinton H. Harris, Serial No. 413,514, filed October 3, 1941.

Between worm thread 74 and the upper wheel 70, sprocket 69 is provided with a narrow annular collar 77 in Figure 1 with a peripheral surface notch 78 adapted to abuttingly engage the end of pawl 62 when the parts are positioned as in Figure 1. Immediately below collar 77, sprocket 69 is integrally formed with a radially projecting cam 80 which as will be explained later is adapted to engage and rotate pawl 62 against the torsional action of spring 67 under certain conditions.

A take up spindle comprising a solid cylindrical bar 79 having a reduced end is rotatably supported at one end in a bearing block 81 rigid with the camera body. Within take up spool chamber 16, an intermediate section of the spindle equivalent in length to slightly more than the width of a thirty-five millimeter film, is removed as a segment to provide a flat ledge 82. Roller retainer collars 83 and 84 are non-rotatably mounted on the spindle at opposite ends of ledge 82, and are positioned to slightly overhang ledge 82 so as to retain the ends of a thin cylindrical roller 85 which is freely rotatable and has sufficient capacity for movement away from and parallel to ledge 82 to permit easy insertion of the end of the film leader strip between the roller and ledge 82. Roller 85 and ledge 82 form a roller wedge clutch which, when the leader strip is inserted therebetween, grips the same and holds it tightly as the spindle is turned to wind the film. Above bearing 81, spindle 79 is further reduced to extend into a knurled knob 86 which is non-rotatably secured thereto as by a suitable screw. Knob 86 is spaced from the top surface of the top camera cover 70 by a compression spring 87 and a washer 87'. Spring 87 urges the spindle axially upwardly until the portion within chamber 16 abuts the camera body. This construction insures a solid feeling take up action and compensates for wear or loose fitting of the spindle in its bearing. It permits speedy assembly, and keeps the spindle parallel to the sprocket so as to insure an efficient winding operation.

Figure 7:
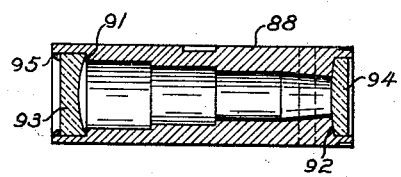
Figure 7 is a longitudinal section of a preferred embodiment of view finder employed in the camera of my invention.

As shown in Figure 2, the lens finder tube 88 is secured as by rivets 89 to the bottom surface of the top wall of the camera in alignment with the center of the lens tube. Referring to Figure 7, tube 88 is preferably made of a thermoplastic composition having a dull finish which can be initially molded to provide accurately spaced lens seats 91 and 92 at opposite ends for the finder lenses 93 and 94. When lenses 93 and 94 have been seated, the ends of tube 88 may be speedily beaded over as shown at 95 at the left end of Figure 7 to permanently locate and seal them in the tube in gas and dust tight relation. This sealing operation can be quickly carried out by means of a heated instrument applied to the tube ends.

*Operation*

With the camera back removed, a film roll or cartridge is positioned in the supply spool chamber (not shown) and the leader strip end pulled out until it is inserted between roller 85 and ledge 82. Spindle 79 should be so initially positioned that ledge 82 is parallel to the back of the camera, and the film end looped back as shown in Figure 1. Knob 86 is rotated to wind the leader strip on spindle 79, roller 85 automatically shifting to wedge and grip the film against ledge 82 due to the drag of the film.

The edge perforations of the film, which is usually the conventional 35 mm. size, mesh with toothed wheels 70 of the sprocket and rotate the latter. Any equivalent film driven roller or the like may be substituted for sprocket 69 without departing from the spirit of the inventon. Rotation of knob 86 is continued until advance of the film is arrested due to locking of sprocket 69. The camera back is now replaced to shield the film from light.

The sprocket is then released for further rotation by depressing button 66, and turning knob 86 until the sprocket again locks. This operation is repeated once more, and results in locating the first unexposed area of the sensitive film before aperture 13. Care must be taken during loading of the camera to insure that the shutter adjustment ring 31 is set for instantaneous exposures to eliminate danger of prematurely exposing the first sensitive area. Detailed description of the operation of the sprocket lock and release mechanism will be given below.

Exposure counter dial 76 is now rotated to zero position on shaft 61.

The camera is now ready for use with the shutter adjusted for instantaneous exposures. Diaphragm adjusting ring 28 is properly rotated, and ring 31 is manipulated for properly focusing the image on the film. Plunger 66 is now in its uppermost position and pawl 62 is engaged with notch 78, as shown in Figures 1 and 2. Under these conditions the shutter mechanism is free to be actuated to expose the film and advance of the film toward the take up spindle is arrested by locked sprocket 69.

The operator sights through finder 88 with his finger on button 66, pushes it down to depress plunger 59 fully, and then removes his finger. When the plunger slides downwardly, it acts through lever 46, link 47, lever 45, shaft 42 and trip levers 41 and 39 to actuate the shutter and make the exposure. In my preferred embodiment, this instantaneous exposure is $\frac{1}{100}$ second but it may be any desired value without departing from the spirit of the invention.

Adjustment of plate 53 to shift the pivot axis of lever 46 serves to compensate for wear of the parts as well as for manufacturing tolerances, and aids adjustment during assembly.

Springs 55 and 67 both urge the shutter actuating mechanism toward the position shown in Figure 1, but each functions separately. Spring 55 is the main spring preventing looseness and play in the linkage between shaft 42 and plunger 59 and insuring the re-establishment of shutter mechanism to operative condition after film is wound for another exposure regardless of the length of time the plunger is depressed, and spring 67 urges the plunger upwardly upon release.

As button 66 is depressed, plunger 59 descends and its enlarged section 65 carries sleeve 63 and pawl 62 downwardly along therewith. This disengages pawl 62 from notch 78. Moreover, as soon as pawl 62 has descended sufficiently to clear collar 77, spring 67 acts torsionally to immediately rotate pawl 62 about the plunger and until the pawl bears on the intermediate portion of sprocket 69 just below collar 77. Sleeve 63 is long enough to prevent undesired rocking of pawl 62.

As soon as the operator releases button 66, the plunger is urged upwardly by spring 67 but is prevented from returning fully to the position of Figure 1 by reason of engagement of the upper side of pawl 62 against the lower face of sprocket collar 77. Pin 68 prevents plunger 59 from moving axially upwardly with respect to pawl 62. Under these conditions, actuation of the shutter through manipulation of the plunger is prevented and the sprocket is unlatched to permit advance of the film. Although the locked plunger is permitted a slight downward displacement opposed by spring 55, this is insufficient to trip the shutter, except where a time exposure is being made as will appear.

The operator now rotates knob 86 to wind the film further on spindle 79 to advance a fresh unexposed area to the exposure aperture. As the moving film rotates sprocket 69, rotating cam 80 engages pawl 62 to rotate the pawl clockwise in Figure 1 and outwardly until it can clear shoulder 77. As soon as pawl 62 has been cammed outwardly sufficient to clear shoulder 77, spring 67 becomes effective thereupon to push the pawl back to the original position of Figures 1, 2 and 4 and the plunger follows along. This re-establishes the shutter mechanism in operative condition so that the shutter may again be released by depression of button 66. Cam 80 is so located with respect to notch 78 that pawl 62 clears shoulder 77 just prior to the time that notch 78 comes around so that pawl 62 immediately enters notch 78 to stop rotation of the sprocket. The dimensions of cam 80 must be such that pawl 62 is not cammed too far outwardly to engage notch 78.

Thus as the shutter mechanism is restored to operative condition through rotation of the sprocket, at substantially the same time, the sprocket is again locked against rotation to arrest film advance and fix the new unexposed portion of the film before the aperture. By manipulation of a single member I effect positive film feed control and shutter operation in my camera and prevent double exposure of the film.

When making time exposures substantially the same procedure is followed as for instantaneous exposures. Initial depression of the plunger opens the shutter and the permissible axial play in the locked plunger is sufficient to trip the shutter levers for closing the shutter. Once the exposure is thus completed, however, the plunger cannot actuate the shutter mechanism until a fresh area of film has advanced.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera having an exposure aperture, means for feeding film across said aperture, a movable control device actuated by movement of said film, releasable stop means adapted to stop movement of said control device for arresting feed of said film after a predetermined linear advance, shutter actuating mechanism, a shiftable member resiliently biased in one direction connected to operate said shutter actuating mechanism to make an exposure when moved in the direction against said bias, means controlled by said device for locking said shiftable member in shifted position where it is inoperable to make a further exposure, means interconnecting said member and said stop means for releasing said stop means upon said exposure making movement of said member, and means controlled by said film moved control device for releasing said locked member to permit it to be returned to its initial position so as to be immediately operable to make a further exposure after said film has been advanced said predetermined amount.

2. In a camera having an exposure aperture, means for feeding film across said aperture, releasable stop means arresting feed of said film after a predetermined advance, shutter actuating mechanism, a shiftable shutter control member resiliently biased in one direction connected to operate said shutter actuating mechanism to open and close the shutter upon movement of said control member in the direction against said bias, means interconnecting said control member and said stop means for releasing said stop means upon said exposure making movement of said control member to enable feed of said film across said aperture, locking means for retaining said shutter control member in shifted position thus rendering said control member inoperable to again operate said shutter actuating mechanism to make an exposure until the film has been further advanced across said aperture to the extent permitted by said stop means, and means operable after movement of the film to that extent for actuating said stop means to arrest feed of the film and at the same time unlocking said locking means to permit return movement of said shutter control member so as to be immediately operable for making a further exposure.

3. In a camera having means for feeding film across an exposure aperture, a sprocket adapted to be engaged and rotated by said film, stop means for arresting rotation of said sprocket, shutter actuating mechanism, a plunger operably connected to said shutter actuating mechanism and said stop means so that depression of said plunger from an initial position operates the shutter to expose the film before the aperture and releases said stop means, resilient means opposing said depression of said plunger, means comprising interengageable members between said plunger and said sprocket for automatically latching said plunger in depressed position after each said exposure to prevent further operation of the shutter by said plunger, and means rotatable with said sprocket operative on said latching means and adapted to unlatch said plunger to permit return of said plunger to its initial position by said resilient means after the film has been sufficiently advanced to move the exposed area beyond said aperture.

4. In a camera, means for winding film toward take up means, a roller adapted to be engaged and rotated by the moving film, a collar on said roller formed with a peripheral recess, a cam on said roller spaced from said collar, a slidable control member provided with a manually accessible button externally of the camera, a pawl rotatably mounted on said control member adapted to be engaged with said recess to stop rotation of said roller and thereby arrest film movement, and a coil spring surrounding said control member with its opposite ends secured to said pawl and the body of said camera respectively, said spring urging said pawl in a selected axial direction and serving to swing said pawl into the path of said cam when the control member is operated to remove said pawl from said recess and thereby permit further film movement, and said spring also serving to shift said pawl back into position to again be engaged with said recess when said pawl is cammed away from said sprocket during said further film movement.

5. In a camera having an exposure aperture controlled by a shutter, shutter actuating mechanism comprising a slidable plunger, a film feed control member adapted to be rotated by the film, an element slidable axially of said plunger, stop means on said film feed control member adapted to be engaged by said element, cam means on said film feed control member adjacent said stop means, and resilient means urging said plunger in one axial direction and said element toward said film feed control member, said element being displaced from engagement with said stop means upon exposure making movement of said plunger against the opposition of said resilient means and being shifted by said cam and said resilient means into reengagement with said stop means after said film has been advanced sufficiently to make a fresh exposure.

6. In a camera, a shutter actuating mechanism, a control member movable in a selected direction for operating said shutter actuating mechanism to make an exposure, a rotatable film feed control device adapted to be engaged and moved by the film, means interlocking said control member and said device for arresting movement of the film comprising a pair of engaged stop elements mounted for relative movement axially of said device in such relation that movement of said control member in said selected direction correspondingly moves one of said stop elements to disengage it from the other stop element and permit movement of the film.

7. In the camera defined in claim 6, means responsive to movement of the film for reestablishing engagement of said stop elements after the film has been moved a predetermined amount.

8. In a camera, shutter actuating mechanism, a slidable plunger operatively connected to said mechanism, a film feed control member adapted to be rotated by movement of the film, and a latch rockably mounted on said plunger adapted to engage a stop on said film feed control member for preventing rotation of said film feed control member and arresting feed of said film, said latch being displaced from engagement with said stop upon exposure-making movement of said plunger.

9. In the camera defined in claim 8, cam means rotatable with said film feed control member adapted to engage and rock said latch when said film has been fed a predetermined amount.

10. In a camera, shutter actuating mechanism, a spring biased control member operably connected to said shutter actuating mechanism and shiftable against the force of said spring to open and close said shutter for making an exposure, a roller rotated by movement of the film, and means interconnecting said control member and roller comprising latch means for arresting rotation of said roller, disengaged by movement of said control member in said exposure making direction, means including said latch means operated by said roller for locking said control member in its shifted position so that it becomes inoperative to make a further exposure after each exposure making movement, means for advancing said film to make a fresh exposure, and means controlled by said roller for immediately releasing said control member to permit spring urged return of said control member to initial position where it becomes immediately operable to make an exposure when the film has been advanced a predetermined amount.

JOHN N. GRAEF.